United States Patent [19]
Hyland et al.

[11] 3,801,203
[45] Apr. 2, 1974

[54] SYSTEM FOR DETECTING PARALLELISM OF SURFACE EDGES

[75] Inventors: Francis B. Hyland, Scituate; Angus W. Mackiernan, Canton, both of Mass.

[73] Assignee: The Gillette Company, Boston, Mass.

[22] Filed: May 16, 1973

[21] Appl. No.: 360,843

[52] U.S. Cl................. 356/151, 356/138, 356/172, 250/219 WD
[51] Int. Cl. ........................................... G01b 11/26
[58] Field of Search ........... 356/138, 150, 151, 152, 356/153, 172; 250/219 WD

[56] References Cited
UNITED STATES PATENTS

| | | | |
|---|---|---|---|
| 3,033,991 | 5/1962 | Sampson | 250/219 WD |
| 3,665,202 | 5/1972 | McLeman | 250/219 WD |
| 3,727,067 | 4/1973 | Shepherd | 250/219 WD |

*Primary Examiner*—Ronald L. Wibert
*Assistant Examiner*—Paul K. Godwin

[57] ABSTRACT

A gauging system for sensing the parallelism of the edges of two surfaces includes two sensing systems, each sensing system including means to sense the position of a point on the edge of each of the two surfaces, and means to produce an output signal as a function of the spacing of the two sensed points, the distance between the points on each edge being sensed by two sensing systems being the same, and means to sense the output signals of the two sensing systems to provide an indication of the parallelism of the two edges.

11 Claims, 7 Drawing Figures

3,801,203

SYSTEM FOR DETECTING PARALLELISM OF SURFACE EDGES

SUMMARY OF INVENTION

This invention relates to gauging systems and more particularly to a gauging system particularly arranged to monitor the parallelism of two edges.

A plural cutting edge shaving system has been developed in which the two cutting edges are disposed parallel and in spaced relation to one another to provide leading and following cutting edges so that both cutting edges are successively active with respect to hair elements being cut during a single shaving stroke. A blade unit of this type is described in copending patent application Ser. No. 176,547, filed Aug. 31, 1971, entitled "Shaving System", and assigned to the same assignee as this application. In the particular embodiment disclosed in that application, the cutting edges of the two blades are spaced apart 0.062±0.004 inch. In the manufacture of such blade units it is desirable to monitor the accuracy of alignment of the cutting edges and it is an object of this invention to provide a gauging system for monitoring the blade edge alignment in such blade units.

Another and more general object of this invention is to provide a novel and improved gauging system for monitoring the parallelism of two spaced edges.

In accordance with the invention there is provided a gauging system for sensing the parallelism of two edges comprising two sensing systems, each of which includes means to sense the position of a point on each of the two edges, and means to produce an output signal as a function of the spacing of the two sensed points, the distance between the points on each edge being sensed by the two sensing systems being the same. The difference between the output signals of the two sensing systems provides an indication of the parallelism of said two edges.

In preferred embodiments, two areas on each of the surfaces are illuminated and each sensing system includes a photosensor for sensing radiation reflected from the illuminated areas. A scanner disposed between the photosensors and said surfaces alternately passes reflected radiation from said two surfaces to said photosensors. Circuitry responsive to each photosensor output signal provides a pulse signal defining a transition in the amount of sensed radiation reflected, and comparator logic responsive to the sensor signals and adjustable tolerance signals control a reject mechanism.

In a particular embodiment, there is provided a system for monitoring the parallelism and spacing of two cutting edges of a blade unit which should be fixed in predetermined substantially parallel relation to one another. The system includes a support for the blade unit and two sensor assemblies. Each sensor assembly includes a light pipe for directing light along a predetermined axis onto the two blade edges, an optical channel having an axis offset from the light axis and a photosensor for sensing light transmitted from the surfaces illuminated by the optical channel. A scanning drum or cylinder, interposed between the sensors and the blade unit support, includes a multiplicity of equally spaced slots that extend parallel to a line defined by the blade unit support and to which the blade edges of the blade unit should be parallel. This cylinder is driven in rotation at a fixed speed and the slots sequentially scan across the illuminated areas to pass light to the sensors. The timing of the system is so arranged that signals representative of the location of each of the two blade edges are passed to the sensor alternately.

The system is arranged so that the maximum sensed light is reflected from the final facet, a reduced amount of light is reflected from the grind facet, and still less light is reflected from the body of each blade.

Signal processing circuitry coupled to each sensor detects the change in light intensity as the scanner slot passes the image of the edge and provides a pulse signal indicative of the blade edge. The time interval between these pulse signals is monitored and a spacing signal is generated as a function of that time interval to provide an indication of the spacing of the two sensed edges. The proper synchronism of the signal processing circuitry is monitored in each cycle (synchronism may be lost due to generation of a spurious signal, for example). Also, the time interval signals of the two sensing systems are monitored to provide a skew indication signal.

Output circuitry responds to the spacing signals and to the skew signals and determines whether they are within preestablished tolerance values. If any signal is outside of the preestablished tolerance value, a reject mechanism is operated to remove the defective blade unit from the production line.

This gauging system is designed for incorporation directly in the production line and is capable of inspecting each blade unit at the production rate. It enables monitoring of dimensions of the precision blade units rapidly and accurately in a system that does not contact the surfaces whose dimensions are being monitored.

Other objects, features and advantages of the invention will be seen as the following description of a particular embodiment progresses, in conjunction with the drawings, in which.

DESCRIPTION OF PARTICULAR EMBODIMENT

Figure 1:
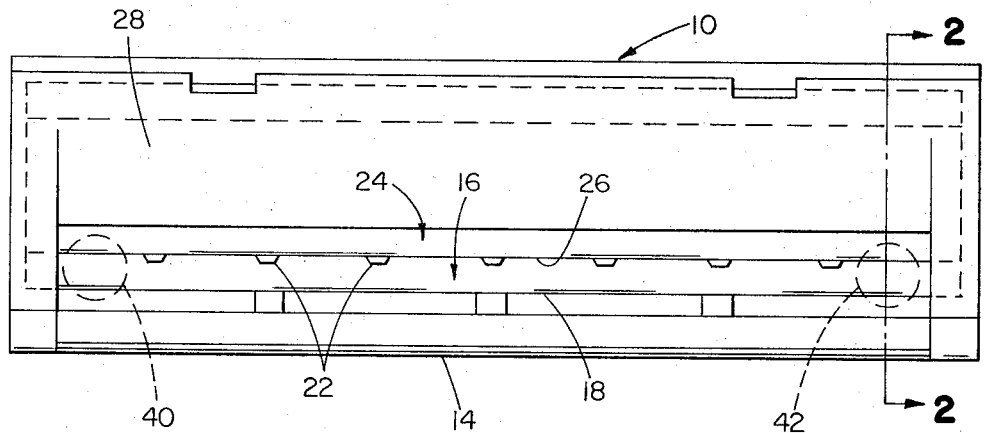
FIG. 1 is a plan view of a razor blade unit that is gauged in accordance with the invention.
Figure 2:
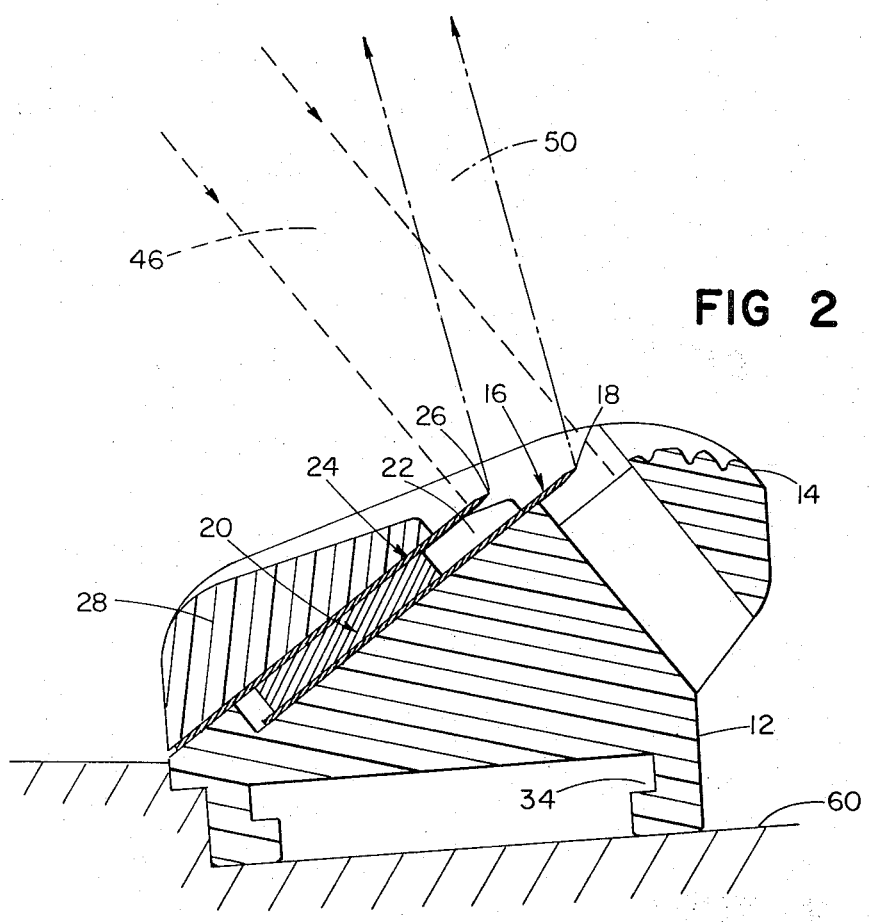
FIG. 2 is a diagrammatic view indicating gauging in accordance with the invention of the razor blade unit shown in FIG. 1.

With reference to FIGS. 1 and 2, there is shown a blade unit 10 that includes a base or platform member 12 that includes a guard member 14 at its forward edge. Stacked on the upper surface of base member 12 are a steel leading blade member 16 having a sharpened cutting edge 18, an aluminum spacer member 20 having a series of teeth 22, and a steel following blade member 24 having a cutting edge 26. The blade elements and spacer member are secured to the base member 12 by means of cap 28 which has integral posts that extend through apertures in blades 16, 24, spacer member 20 and base member 12, the protruding ends of which are deformed to secure the assembly together as a unit. Groove structure 34 in the base enables the blade unit to be attached to a handle member.

In order to provide the desired shaving characteristics, the cutting edges 18 and 26 should be disposed parallel to one another and to guard structure 14 and spaced 0.062 inch ±0.004 inch apart. In accordance with the invention this gauging is accomplished by sensing the exposed ends of the blades at areas 40 and 42 as indicated in FIG. 1. Two separate beams of light 46 are projected on areas 40 and 42; and two associated sensing systems, the axis 50 of each being disposed at an angle of about 24° to the axis of its incident beam. The blade unit 10 is disposed so that the plane containing the edges of the blades is perpendicular to sensing axes 50.

Figure 3:
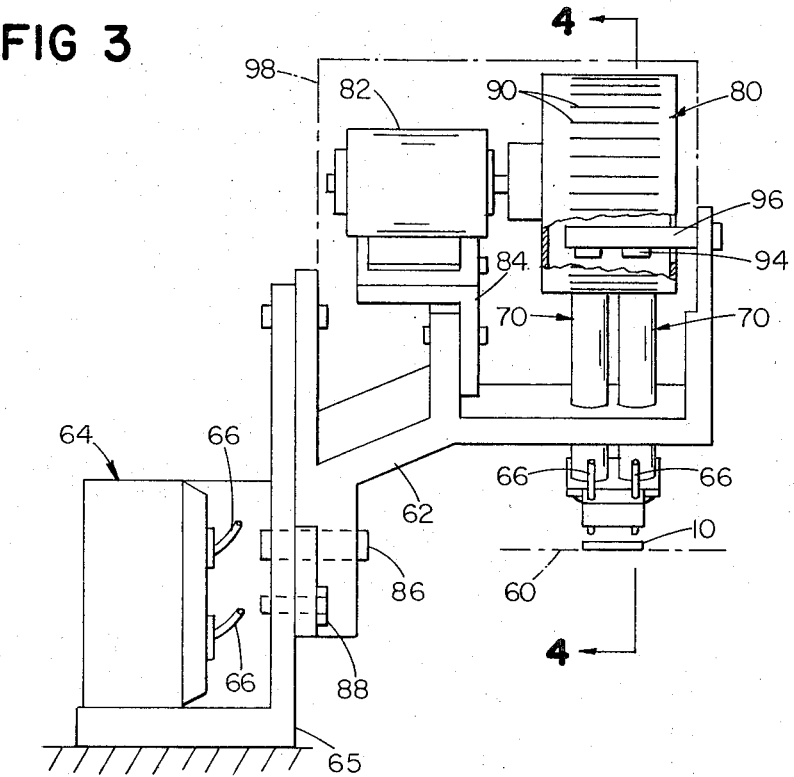
FIG. 3 is a front view of gauging apparatus constructed in accordance with the invention.
Figure 4:
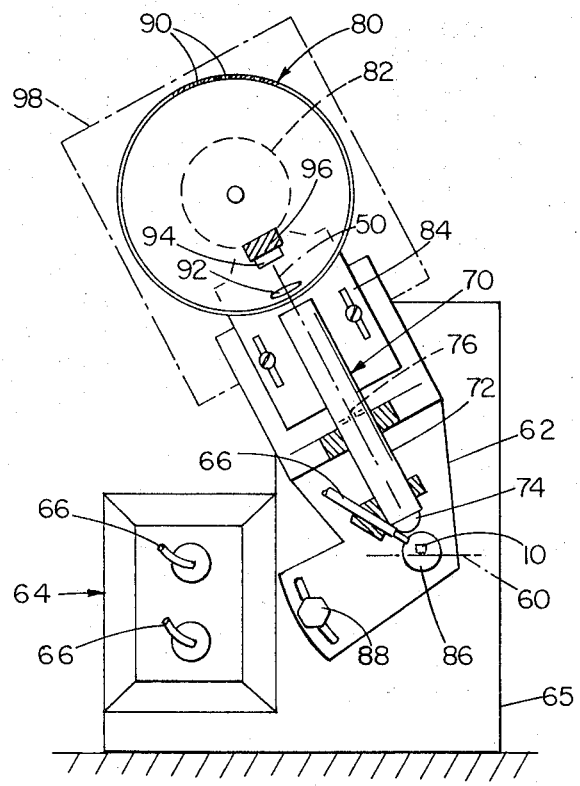
FIG. 4 is a sectional view taken along the line 4—4 of FIG. 3 of the apparatus shown in FIG. 3.

Additional details of the gauging apparatus may be seen with reference to FIGS. 3 and 4. That gauging apparatus includes a blade unit support 60 for receiving a blade unit in position for gauging and a sensing assembly mounted on support bracket 62. The sensing assembly includes a light source 64, two fiber optic light systems 66, each of which produces a light beam 46, two optical units 70, each of which includes a lens system to provide 6X magnification along the sensing axis, the optical unit 70 being supported on tube 72 and including an objective lens 74 and an aperture plate 76. Also supported above tubes 72 is a drum 80 driven in rotation by motor 82 which is supported on framework member 84 bolted to support bracket 62. Bracket 62 in turn is mounted for rotation about shaft 86 and secured in position by clamp bolt 88 on support 65.

Forty slots 90, each one thirty-seconds inch wide, are equally spaced one-half inch apart, around the periphery of drum 80. Motor 82 in this embodiment is a one-fortieth horsepower 60 Hertz motor that drives drum 80 at 1,725 r.p.m. A condensing lens 92 and a photosensor 94 are positioned in each light path 50 as supported by arm 96. Housing 98 encloses the drum system.

Figure 6:
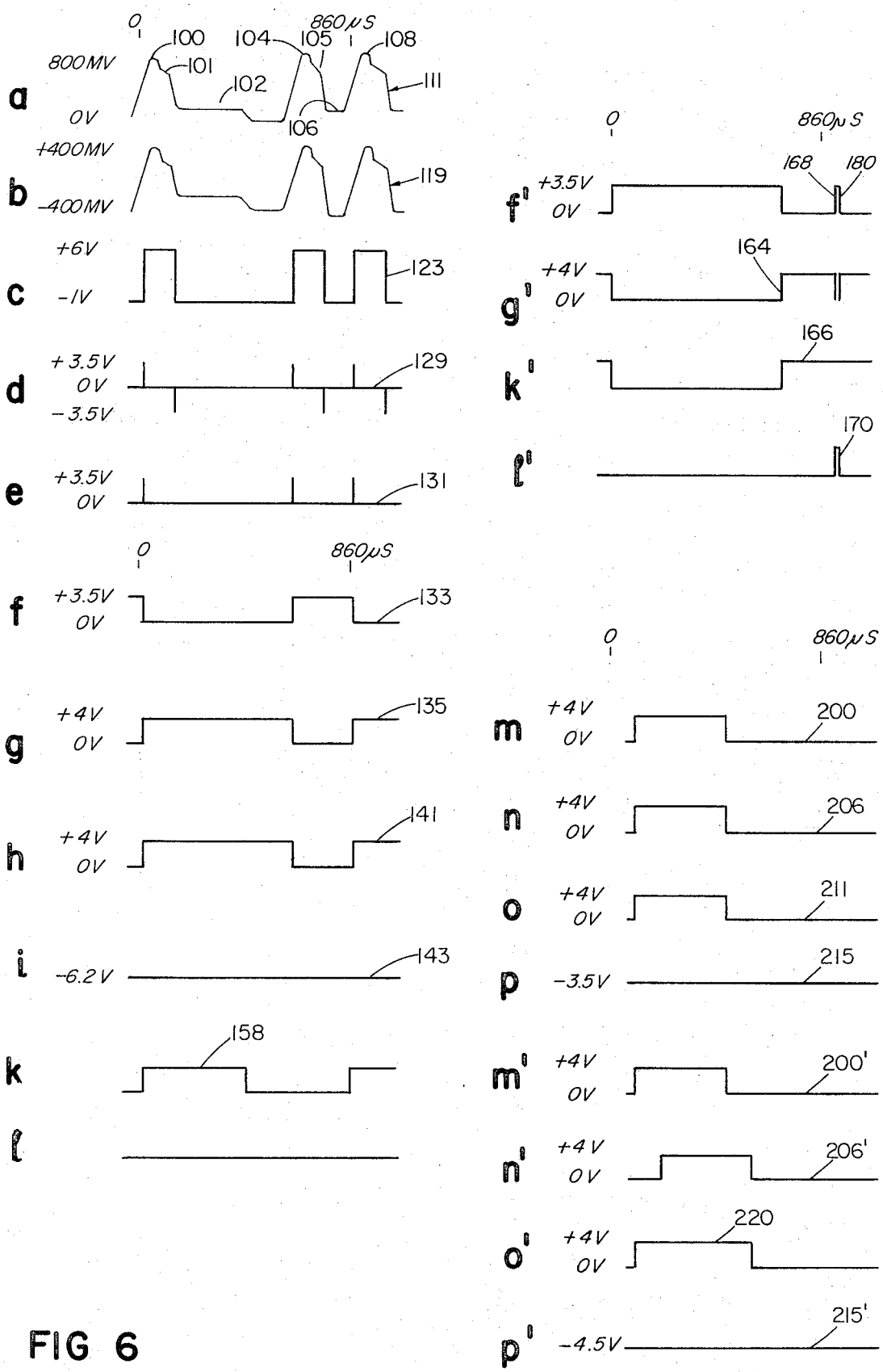
FIG. 6 is a diagram indicating timing relationships of circuitry shown in FIG. 5.

As drum 80 rotates, the photocells 94 sense the light reflected along paths 50 and passed by slits 90. The waveform of the sensed light electrical output signal from the photocell is indicated in FIG. 6, the photocell output increasing rapidly to a peak 100 which is representative of the leading edge 18 and finish facet, then dropping to a transition point 101 which is representative of the grind facet of blade 16, then dropping to level 102 representative of the space between the two blades and then similarly indicating the finish facet of edge 26 of blade 24 at point 104 the grind facet of blade 24 at point 105 and the blade body at point 106. The next peak 108 is the output of photocell in response to the sensing of the leading edge 18 of blade 16 by the next slot 90. The gauging system geometry and timing is such in this embodiment that the successive slot signals are about 860 microseconds apart and with the desired spacing blade edge spacing of 0.062 inch peaks 100 and 104 are about 620 microseconds apart.

Figure 5:
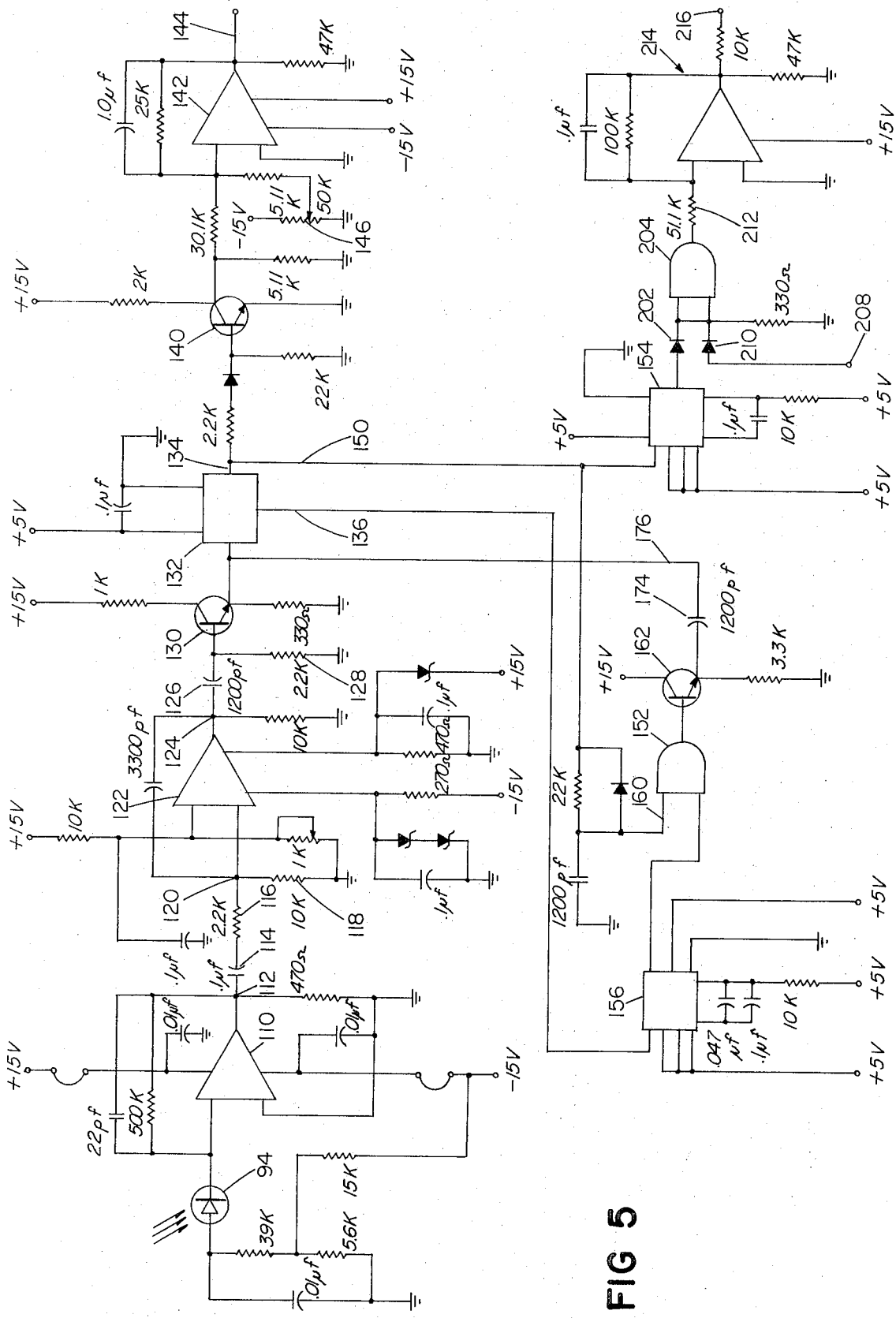
FIG. 5 is a schematic diagram of circuitry employed with the apparatus shown in FIG. 3.

Details of the signal processing circuitry from photocell 94 are indicated in FIG. 5. As indicated in that Figure, there is provided operational amplifier 110 connected to the output of photocell 94 and the waveform 111 shown in line 6a appears at junction 112. That waveform 111 is coupled by capacitor 114 and resistor network resistors 116, 118 to provide the waveform 119 indicated in FIG. 6b at junction 120. That waveform is applied to operational amplifier 122 and its shaped output 123 at junction 124 is indicated in FIG. 6c. The differentiating network of capacitor 126 and resistor 128 produces the pulse sequence 129 generally indicated at FIG. 6d for application to emitter follower circuit 130 to produce the blade edge indicating output 131 at the emitter as indicated in FIG. 6e.

Those unidirectional blade edge pulses are applied to toggle circuit 132 which produces the waveform 133 indicated in FIG. 6f at its output 134 and the complementary waveform 135 indicated in FIG. 6g at its output 136. The signal at output terminal 134 is passed by amplifier 140 and inverted (141) as indicated in FIG. 6h for application to averaging circuit 142 to provide an output 143 on line 144 as indicated in FIG. 6i, the voltage value of which indicates the spacing between edges 18 and 26. Adjustable resistor 146 provides compensation for optical errors, etc.

The output 133 at terminal 134 is also applied over line 150 as one input AND circuit 152 and as an input to single shot 154. The output 135 on line 136 is applied as an input to single shot 156. Single shot 156 is triggered by transition on terminal 136 and produces an output pulse 158 of 400 microseconds duration as indicated in FIG. 6k (generating a conditioning level for AND circuit 152 applied over line 160). During that interval the signal 133 on line 134 is not positive and AND circuit 152 does not have an output for application to transistor 162. However, should toggle circuit 132 be out of phase, as indicated in FIGS. 6f' and 6g', one shot 156 will be triggered by signal transition 164 and produce output 166 (FIG. 6k') for the 400 microsecond interval. When the signal on line 134 goes high in response to the next blade edge indication (indicated at line 168) AND gate 152 will have an output 170 which is amplified by transistor 162 to produce an output which is passed as a resynchronizing pulse by capacitor 174 on line 176 to the input of toggle circuit 132 to reset toggle circuit 132 as indicated at 180 (resynchronizing the waveforms indicated at FIG. 6f' and g' with the blade edge signals).

The output 133 is also applied over line 150 to one shot circuit 154 which has an output 200 (FIG. 6m) which is passed by diode 202 to one input of AND circuit 204. A similar output 206 (FIG. 6n) from the other sensing channel is applied from the corresponding one shot circuit to terminal 208 passed by diode 210 to the second input of OR circuit 204. The resulting output 211 (indicated by FIG. 6o) is applied through resistor 212 to averaging circuit 214 which provides an output 215 at terminal 216 as indicated in FIG. 6p (average voltage output of −3.5 volts).

However, if the ends of the two blades are skewed relative to the sensing circuits, the one shot output 200' of one channel as indicated in FIG. 6m' will be offset with respect to the one shot output 206' of the other channel and the output 211 of OR circuit 204 will be longer as indicated at 220 shifting the average output at terminal 216 as indicated by FIG. 6p' (line 215').

Figure 7:
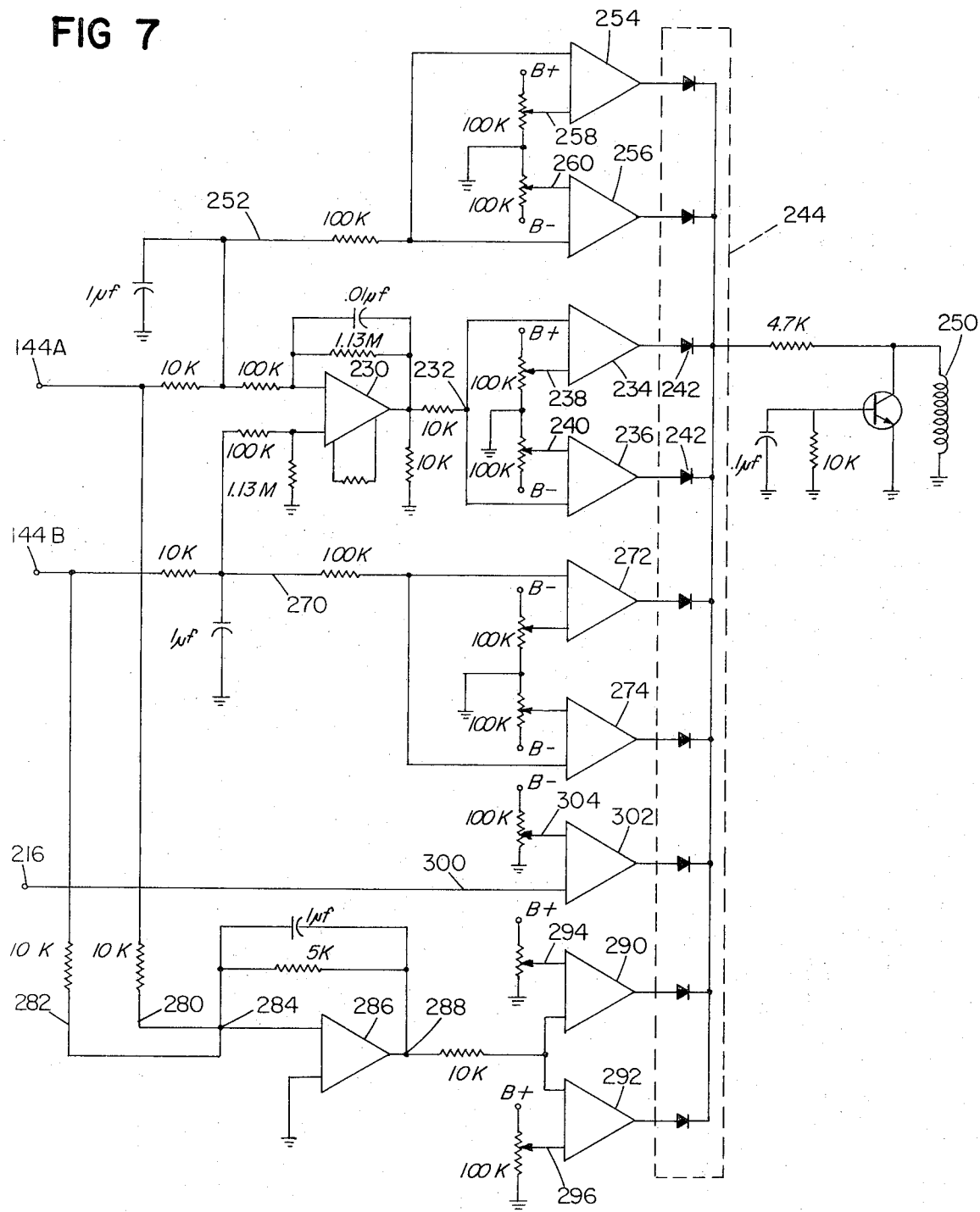
FIG. 7 is a diagram of reject logic employed with the circuitry shown in FIG. 5.

The outputs at terminals 144A and 144B and terminal 216 are applied to logic circuitry as indicated in FIG. 7. The two signals at terminals 144A and 144B are applied to subtractor logic 230 and its output at terminal 232 is applied to comparator units 234, 236. Comparator 234 has tolerance voltage input on line 238 and produces an output if the voltage on line 232 is more than the voltage on line 238; while comparator 236 has a tolerance voltage input on line 240 and produces an output if the voltage on line 232 is less than the voltage on line 240. Coupled to the outputs of comparators 234, 236 are diodes 242 of OR circuit 244 and its output is applied to control output relay 250 which operates a reject mechanism to remove that blade unit from the processing line.

The voltage from output terminal 144A is also applied over line 252 to two comparators 254, relay each of which has a tolerance voltage input on lines 258, 260, respectively. These comparators gauge the spacing between the two blades, as indicated by the absolute value of the voltage at terminal 144A, and if this voltage is either above or below specified offset values, the appropriate comparator circuit 254 or 256 will produce an output to operate reject relay 250. Similarly, the signal on line 144B is applied over line 270 to comparators 272, 274. The second inputs to comparators 272 and 274 are set similar to the second inputs to comparators 254 and 256 and if either has an output is applied to operate realy 250.

The signals at terminals 144A and 144B are also applied over lines 280, 282 to summing junction 284 and amplifier 286 which is connected to produce an average output at terminal 288 for application to comparators 290, 292. Their tolerance or offset inputs (294, 296) are compared and if either comparator has an output, OR circuit 244 operates relay 250.

Finally, the skew signal at terminal 216 is applied over line 300 to comparator 302. The second or tolerance input to comparator 302 is over line 304 and if the skew voltage (line 300) exceeds that set value, the resulting comparator output is passed by OR circuit 244 to operate the reject relay 250.

While a particular embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention.

What is claimed is:

1. A gauging system for sensing the parallelism of the edges of two surfaces comprising:
   two sensing systems, each said sensing system including means to sense the position of a point on the edge of each of said two surfaces, and means to produce an output signal as a function of the spacing of the two sensed points, the distance between the points on each edge being sensed by said two sensing systems being the same, and
   means to sense said output signals of said two sensing systems to provide an indication of the parallelism of said two edges.

2. The gauging system as claimed in claim 1 wherein each said sensing system includes:
   means to illuminate said two surfaces,
   a photosensor for sensing radiation reflected from the illuminated surfaces,
   and scanning means disposed between said photosensor and said surfaces for sequentially passing reflected radiation from said two surfaces to said photosensor.

3. The gauging system as claimed in claim 2 wherein sensing means further includes circuitry responsive to the photosensor output signal to provide a pulse signal defining a transition in the amount of sensed reflected radiation.

4. The gauging system as claimed in claim 1 and further including comparator logic responsive to the output signals of said sensing means, and adjustable means to provide tolerance limints to said comparator means for comparison with said output signals.

5. The gauging system as claimed in claim 1 wherein said surfaces are the cutting edges of razor blades.

6. A gauging system for sensing the parallelism of the cutting edges of two razor blades in a blade unit comprising:
   a support for said blade unit,
   means to illuminate portions of the blades including the cutting edges adjacent to either end of the blade unit,
   two sensing systems, each sensing system including an optical channel for transmitting light reflected from the blades, a photosensor coupled to said optical channel, and circuitry for producing an output signal in response to a transition in radiation sensed by said photosensor,
   a scanning drum having a multiplicity of equally spaced apertures disposed around its periphery, said drum being interposed between said blade unit support and said photosensors of said sensing systems, means to rotate said drum at a uniform speed, and
   signal processing circuitry responsive to said two sensing systems for sensing the difference between the output signals of said two sensing systems to provide an indication of the parallelism of said two edges.

7. The system as claimed in claim 6 wherein said signal processing circuitry further includes circuitry for sensing the absolute value of the output signal of each sensing system.

8. The system as claimed in claim 6 wherein said signal processing circuitry further includes circuitry for sensing the difference between output signals from said sensing systems representative of the position of one cutting edge.

9. The system as claimed in claim 6 wherein said signal processing circuitry further includes circuitry responsive to the photosensor output signal to provide a pulse signal defining a transition in the amount of sensed reflected radiation.

10. The system as claimed in claim 6 wherein said signal processing circuitry includes comparator logic responsive to the output signals of said sensing means, and adjustable means to provide tolerance limits to said comparator means for comparison with said output signals.

11. The system as claimed in claim 10 wherein said signal processing circuitry further includes circuitry for sensing the absolute value of the output signal of each sensing system and circuitry for sensing the difference between output signals from said sensing systems representative of the position of one cutting edge.

* * * * *